United States Patent [19]
Pintavalli et al.

[11] Patent Number: 5,511,512
[45] Date of Patent: Apr. 30, 1996

[54] MODULAR BIRD PERCH AND BIRD CAGE

[76] Inventors: Nanci A. Pintavalli; Willis J. Whittaker, both of 5731 Henderson Dr., Delaware, Ohio 43015

[21] Appl. No.: 310,380

[22] Filed: Sep. 22, 1994

[51] Int. Cl.$^6$ .......................... A01K 31/08; A01K 31/12
[52] U.S. Cl. .................. 119/468; 119/537; 119/706
[58] Field of Search ................... 119/26, 17, 706, 119/52.2, 52.3, 57.8, 57.9; 248/146, 158, 159; 211/128, 130, 180, 86

[56] References Cited

U.S. PATENT DOCUMENTS

| | | | |
|---|---|---|---|
| 2,887,988 | 5/1959 | Cottongim | 119/57.9 |
| 3,479,990 | 11/1969 | Crow | 119/706 |
| 3,595,209 | 7/1971 | Parker | 119/706 |
| 3,785,343 | 1/1974 | Baratta . | |
| 4,101,036 | 7/1978 | Craig | 211/86 |
| 4,104,986 | 8/1978 | Dunigan | 119/17 |
| 4,285,301 | 8/1981 | Voss . | |
| 4,528,941 | 7/1985 | Spengler . | |
| 4,552,093 | 11/1985 | Puckett . | |
| 4,586,463 | 5/1986 | Braeuner . | |
| 4,627,384 | 12/1986 | Courteau | 119/26 |
| 5,377,619 | 1/1995 | Katz | 119/17 |

FOREIGN PATENT DOCUMENTS

| | | | |
|---|---|---|---|
| 1206853 | 5/1963 | Germany | 119/17 |
| 3524619 | 1/1987 | Germany | 119/17 |
| 8101728 | 12/1981 | Netherlands | 119/706 |

*Primary Examiner*—Todd E. Manahan

[57] ABSTRACT

A bird perch apparatus includes a floor base assembly, and a pole assembly is connected to the floor base assembly. A ceiling-contacting assembly is connected to the pole assembly. A lower pan assembly is supported by the pole assembly. An upper pan assembly is supported by the pole assembly a predetermined distance above the lower pan assembly, and a perch assembly is connected to the pole assembly at a position along the pole assembly between the lower pan assembly and the upper pan assembly. The lower pan assembly is circular and includes a central aperture for receiving the pole assembly. The upper pan assembly is circular and includes a central aperture for receiving the pole assembly. A cage assembly is supported by the lower pan assembly and is capped by the upper pan assembly. The pole assembly includes a first adjustable portion and a second adjustable portion which are adjustable longitudinally with respect to each other. The pole assembly includes a plurality of modules that have a head end and a tail end and arranged in head-to-tail fashion. A cage assembly can include a vertical stack of a plurality of cage segments separated by either segment connector assemblies or combined segment connector/tray assemblies.

7 Claims, 5 Drawing Sheets

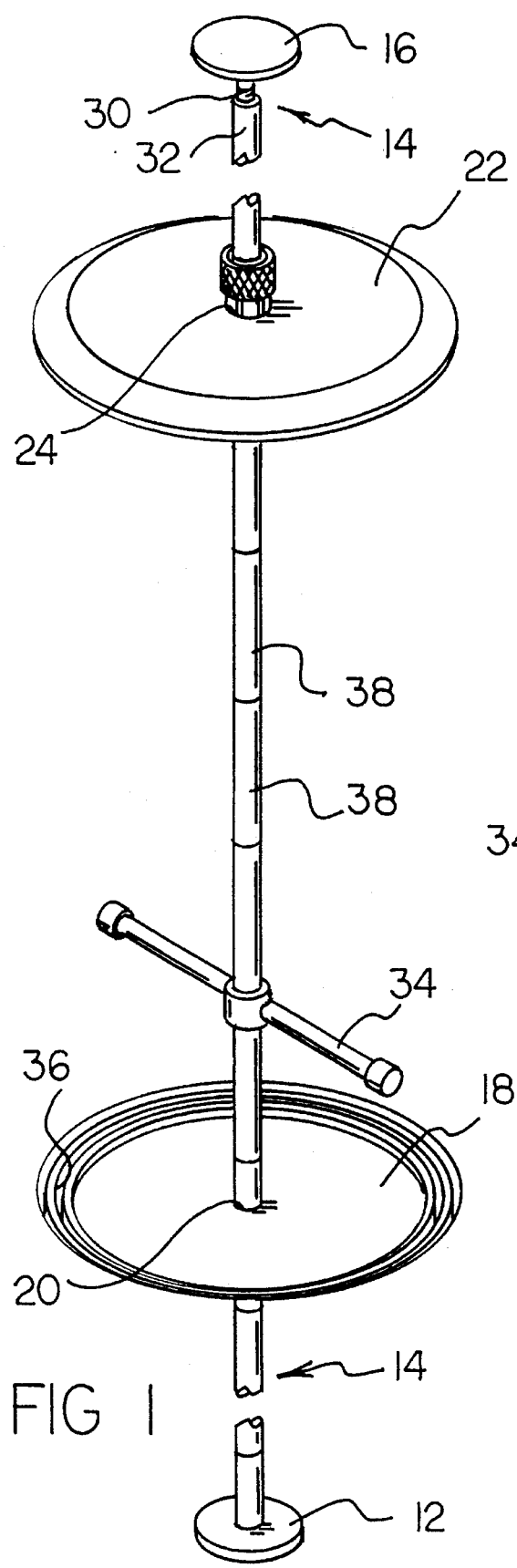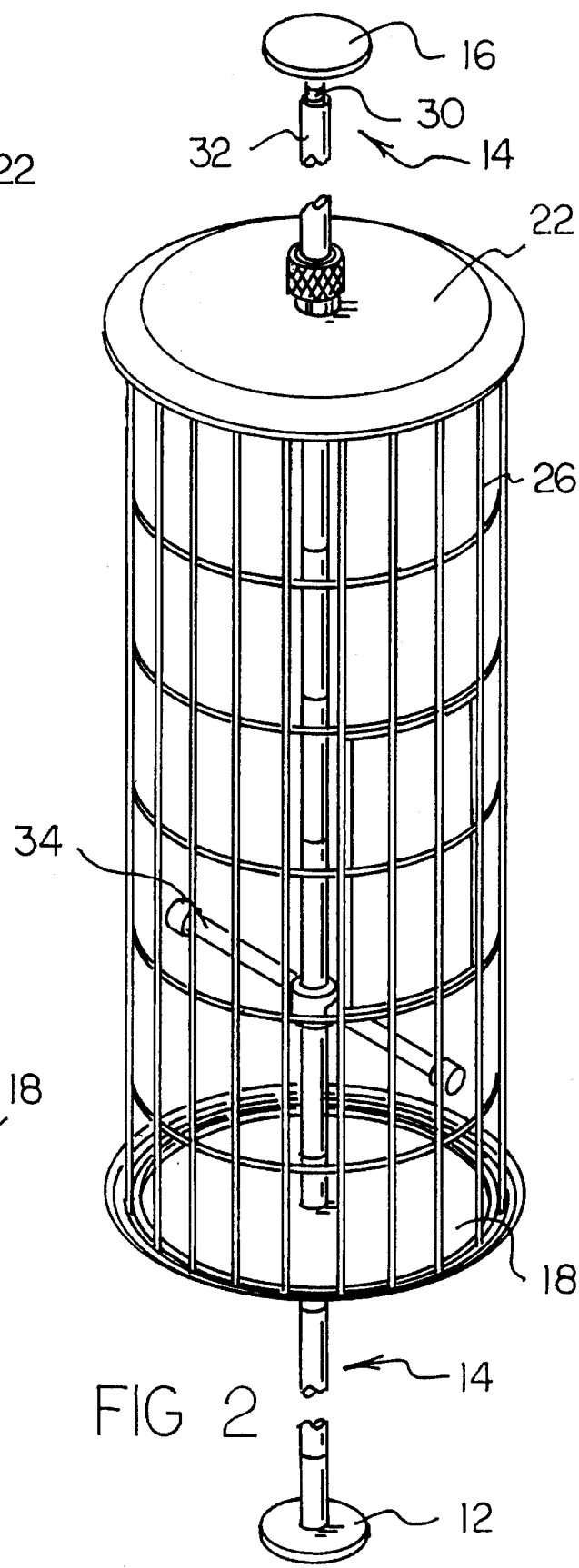

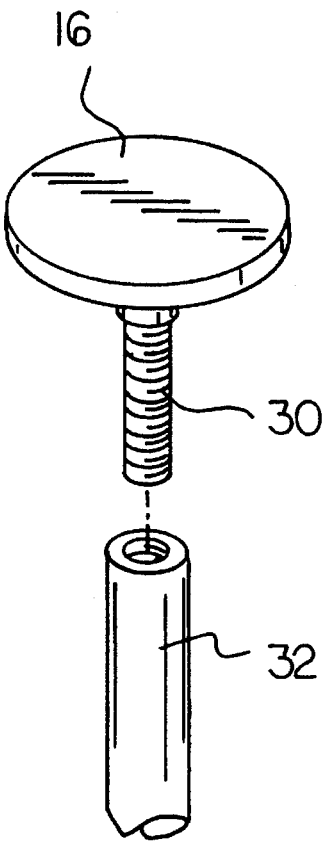
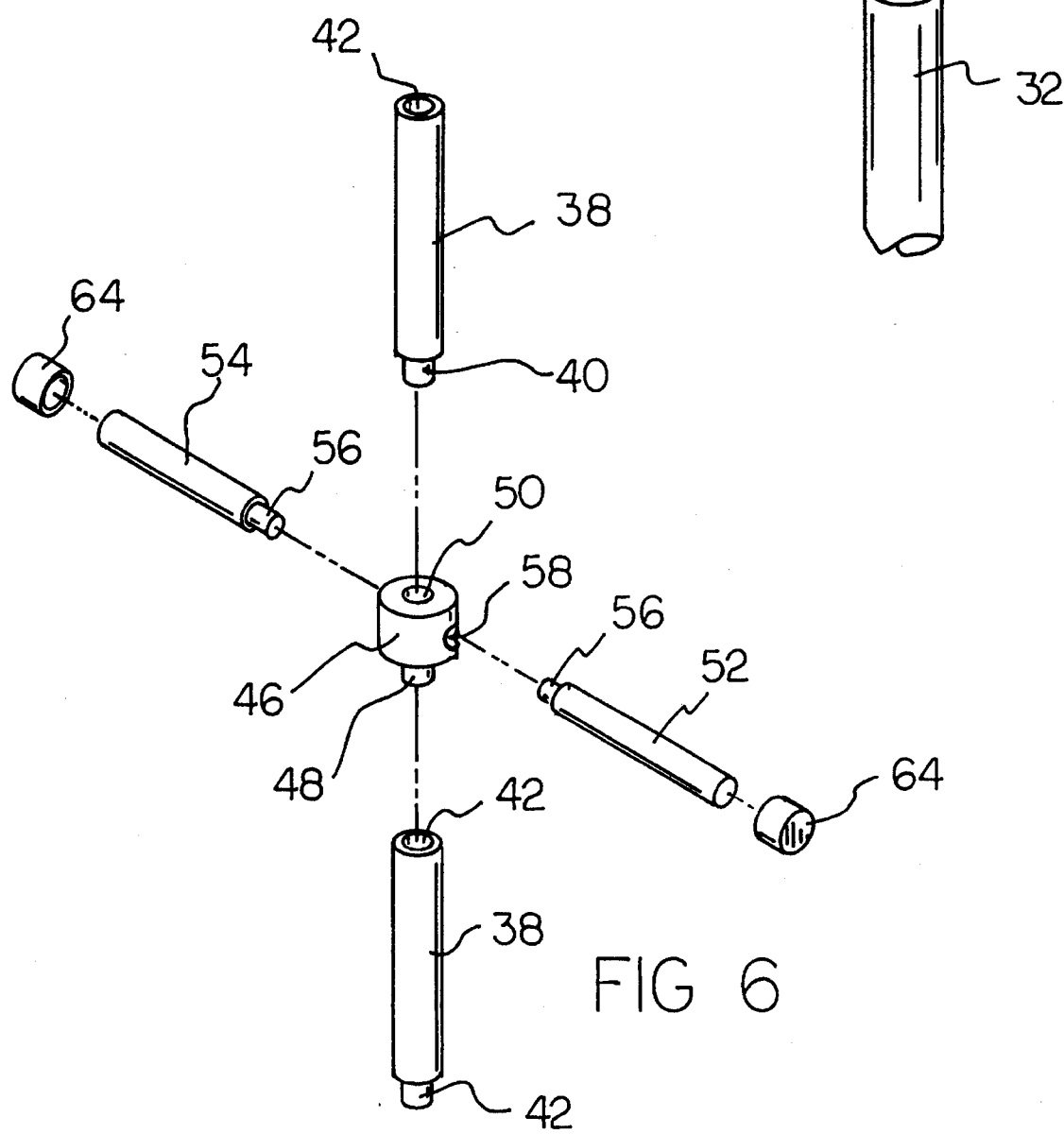

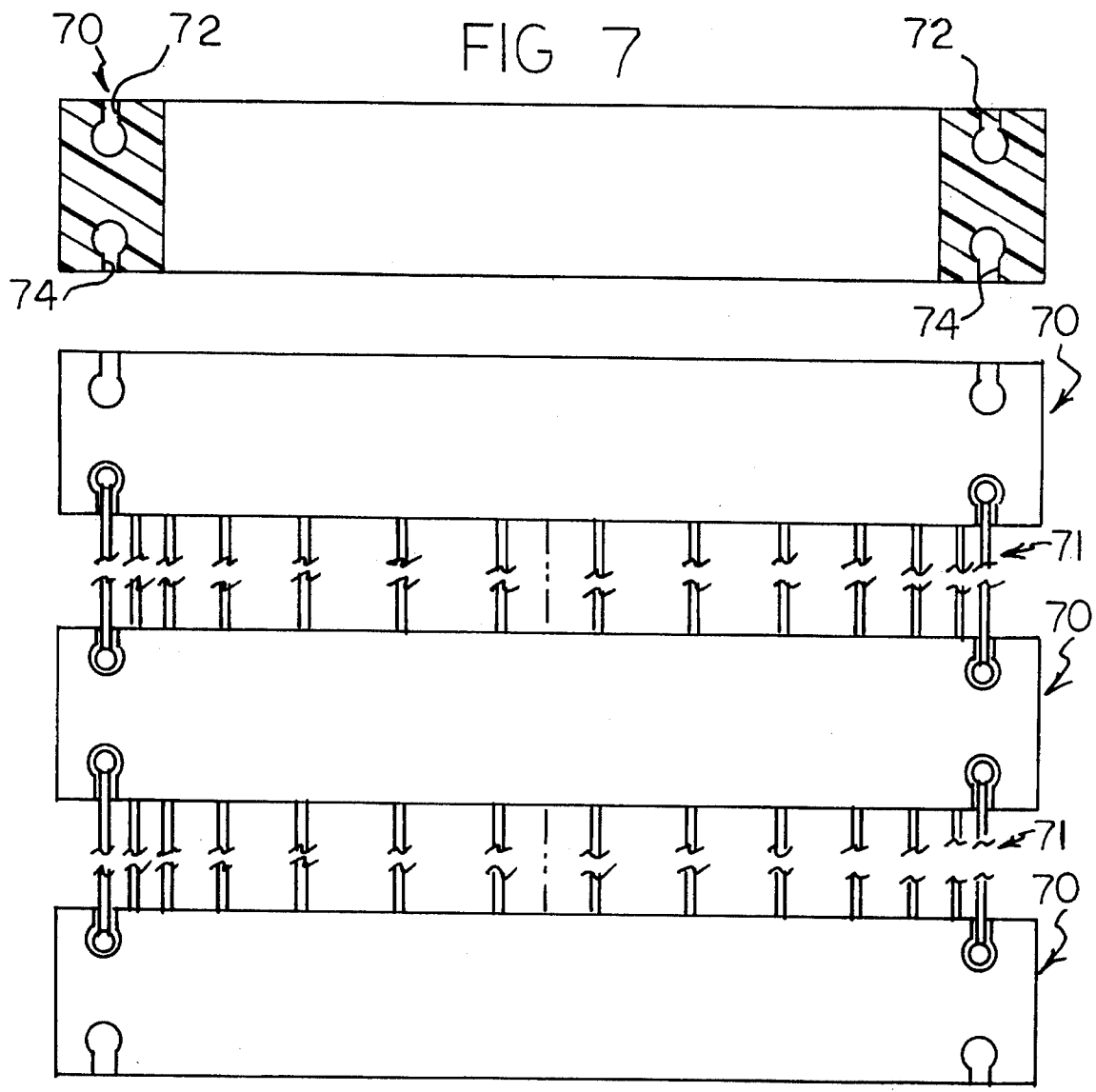
FIG 7
FIG 8
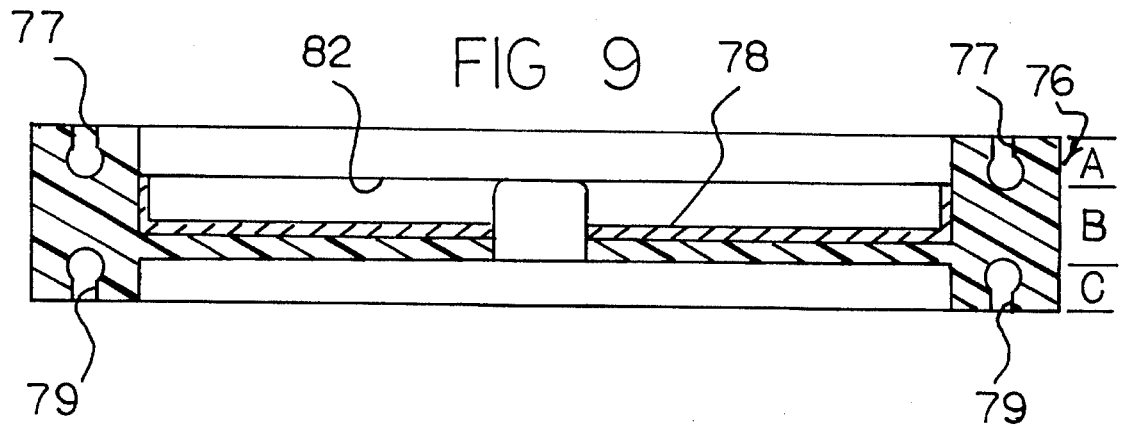
FIG 9

MODULAR BIRD PERCH AND BIRD CAGE

BACKGROUND OF THE INVENTION

1. Field of the Invention

The present invention relates generally to perches for birds and, more particularly, to perches especially adapted for use in a human dwelling.

2. Description of the Prior Art

Many people have pet birds in rooms in their dwellings. Most often pet birds are kept inside cages that are either supported by a floor-supported horizontal surface, such as a table or the floor, or suspended from a ceiling fixture. Cages that are supported by a table may inadvertently slide off or be knocked of the table. Cages that are suspended from a ceiling are constantly subjected to the force of gravity to tear the ceiling support out of the ceiling. In this respect, it would be desirable if a cage were provided which prevented a cage from sliding off or being knocked of a horizontal support. In addition, it would be desirable if a cage were provided that is not suspended from a ceiling support.

Bird cages generally include an enclosure that has a vertical height that is far less than the vertical height of the room. More specifically, a typical room inside a human dwelling has a floor and a ceiling separated from each other by a distance of eight feet or more. Yet, the vertical height of the cage enclosure is most often considerably less than the distance between floor and ceiling. In this respect, it would be desirable if a bird enclosure could utilize a large amount of the vertical distance from floor to ceiling in room.

Vertical walls in a dwelling are stable structures, and one reason for their stability is the fact that the walls extend from the ceiling to the floor. That is, vertical walls are support at both their tops and bottoms. In this respect, it would be desirable if a bird retaining device were provided that is stabilized by both a floor and a ceiling of a room.

Different people have different heights. For people who have birds in their homes, cages must be cleaned periodically, and for a cage to be cleaned most comfortably by a person, the distance of the floor of the cage from the floor of the room may have to adjusted with respect to the height of the person cleaning the cage. In this respect, it would be desirable if a bird cage were supported in a way so that the distance of the cage from the floor could be adjusted to accommodate the height of a person.

Throughout the years, a number of innovations have been developed relating to bird cages, and the following U.S. patents disclose some of those innovations: U.S. Pat. Nos. 3,785,343; 4,285,301; 4,528,941; 4,552,093; and 4,586,463. It is noted, however, that none of the above-cited patents discloses a bird cage that is supported by both a floor and a ceiling of a room.

Still other features would be desirable in a bird perch or cage apparatus. In a typical room in a dwelling, available floor space is often limited because of a large number of items located on the floor. As a result, in order to occupy a small amount of floor space, bird cages are often made relatively small. However, the cage size is often smaller than desirable for providing a bird an adequate air space for adequate exercise. In this respect, it would be desirable if a bird cage were provided that provided adequate air space within the cage but that did not occupy much floor space.

Perches in bird cages are often made from simple cylindrical wooden rods. As such, they do not simulate tree bark, and as a result, do not simulate real tree branches and tree trunks. In this respect, it would be desirable if perches in a bird cage simulated real tree branches. Aside from aesthetic appearance, other benefits can be derived from the use of perches that simulate tree branches. For example, such perches help wear down a bird's toenails and help stimulate the bird's footpads. Such stimulation could help prevent problems such as bumble foot which is a common problem in captive psittacines.

Thus, while the foregoing body of prior art indicates it to be well known to use bird cages with perches therein, the prior art described above does not teach or suggest a bird perch apparatus which has the following combination of desirable features: (1) utilizes a large amount of the vertical distance from floor to ceiling in room; (2) prevents a cage from sliding off or being knocked of a horizontal support; (3) is not suspended from a ceiling support; (4) is stabilized by both a floor and a ceiling of a room; (5) is supported in a way so that the distance of the cage from the floor can be adjusted to accommodate the height of a person; (6) provides extensive air space within the cage without occupying much floor space; and (7) simulates real tree branches. The foregoing desired characteristics are provided by the unique bird perch apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a bird perch apparatus which includes a floor base assembly, and a pole assembly is connected to the floor base assembly. A ceiling-contacting assembly is connected to the pole assembly. A lower pan assembly is supported by the pole assembly. An upper pan assembly is supported by the pole assembly a predetermined distance above the lower pan assembly, and a perch assembly is connected to the pole assembly at a position along the pole assembly between the lower pan assembly and the upper pan assembly. The lower pan assembly is circular and includes a central aperture for receiving the pole assembly. The upper pan assembly is circular and includes a central aperture for receiving the pole assembly.

A cage assembly is supported by the lower pan assembly and is capped by the upper pan assembly. The pole assembly includes a first adjustable portion and a second adjustable portion which are adjustable longitudinally with respect to each other. The pole assembly includes a plurality of modules that have a head end and a tail end and arranged in head-to-tail fashion.

A cage assembly can include a vertical stack of a plurality of cage segments separated by either segment connector assemblies or combined segment connector/tray assemblies.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bird perch apparatus which has all of the advantages of the prior art and none of the disadvantages.

It is another object of the present invention to provide a new and improved bird perch apparatus which may be easily and efficiently manufactured and marketed.

It is a further object of the present invention to provide a new and improved bird perch apparatus which is of durable and reliable construction.

An even further object of the present invention is to provide a new and improved bird perch apparatus which is susceptible of a low cost of manufacture with regard to both materials and labor, and which accordingly is then susceptible of low prices of sale to the consuming public, thereby making such bird perch apparatus available to the buying public.

Still yet a further object of the present invention is to provide a new and improved bird perch apparatus which utilizes a large amount of the vertical distance from floor to ceiling in room.

Still another object of the present invention is to provide a new and improved bird perch apparatus that prevents a cage from sliding off or being knocked of a horizontal support.

Yet another object of the present invention is to provide a new and improved bird perch apparatus which is not suspended from a ceiling support.

Even another object of the present invention is to provide a new and improved bird perch apparatus that is stabilized by both a floor and a ceiling of a room.

Still a further object of the present invention is to provide a new and improved bird perch apparatus which is supported in a way so that the distance of the cage from the floor can be adjusted to accommodate the height of a person.

Yet another object of the present invention is to provide a new and improved bird perch apparatus that provides extensive air space within the cage without occupying much floor space.

Still another object of the present invention is to provide a new and improved bird perch apparatus which simulates real tree branches.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the bird perch apparatus of the invention without including a cage.

FIG. 2 is a perspective view of the embodiment of the invention shown in FIG. 1 which also includes a cage.

FIG. 5 is an enlarged partially exploded perspective view of a ceiling engaging portion of the embodiment of the invention shown in FIG. 1.

FIG. 6 is an enlarged partially exploded perspective view of a perch portion of the embodiment of the invention shown in FIG. 1.

FIG. 7 is a cross-sectional view of a segment connector assembly used for connecting cage segments in head-to-tail fashion.

FIG. 8 is a schematic diagram of a number of cage segments connected in head-to-tail fashion in a stack with intervening segment connector assemblies in between the cage segments.

FIG. 9 is a cross-sectional view of a combined segment connector/tray assembly used for creating a vertical stack of alternating cage segments and combined segment connector/tray assemblies.

DESCRIPTION OF THE PREFERRED EMBODIMENT

Figure 3:
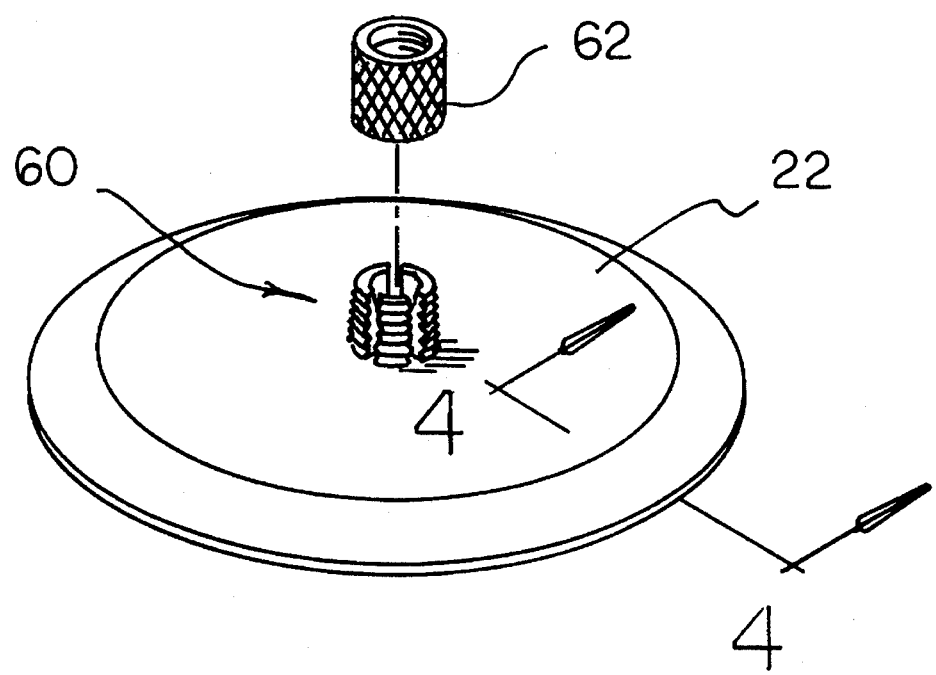
FIG. 3 is an enlarged partially exploded perspective view of a top portion of the embodiment of the invention shown in FIG. 1.
Figure 4:
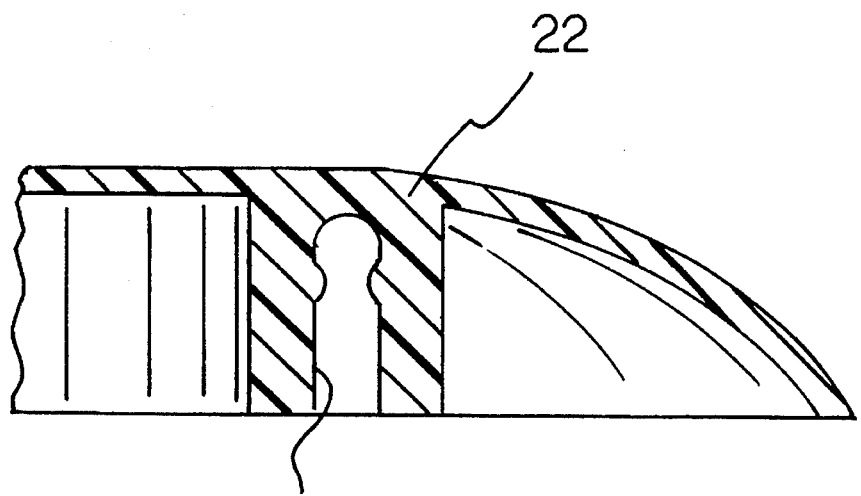
FIG. 4 is an enlarged partial cross-sectional view of the portion of the embodiment of the invention shown in FIG. 3 taken along line 4—4 in FIG. 3.

With reference to the drawings, a new and improved bird perch apparatus embodying the principles and concepts of the present invention will be described.

Turning to FIGS. 1–6, there is shown an exemplary embodiment of the bird perch apparatus of the invention generally designated by reference numeral 10. In its preferred form, bird perch apparatus 10 includes a floor base assembly 12, and a pole assembly 14 is connected to the floor base assembly 12. A ceiling-contacting assembly 16 is connected to the pole assembly 14. A lower pan assembly 18 is supported by the pole assembly 14. An upper pan assembly 22 is supported by the pole assembly 14 a predetermined distance above the lower pan assembly 18, and a perch assembly 34 is connected to the pole assembly 14 at a position along the pole assembly 14 between the lower pan assembly 18 and the upper pan assembly 22. The lower pan assembly 18 is circular and includes a central aperture 20 for receiving the pole assembly 14. The upper pan assembly 22 is circular and includes a central aperture 24 for receiving the pole assembly 14.

The perch assembly 34 employs recycled plastic that simulates natural tree bark. The simulated natural tree bark can also be used for the pole assembly 14. The simulated tree bark helps the toenails of the bird to wear and stimulates the bird's footpads. Plastic materials that can be employed include polyethylene and polypropylene, among others.

A cage assembly 26 is supported by the lower pan assembly 18 and is capped by the upper pan assembly 22. The cage assembly 26 is cylindrical in shape, and the lower pan assembly 18 and the upper pan assembly 22 each have respective annular grooves 36 for receiving respective top and bottom edges of the cylindrical cage assembly 26. The cage assembly 26 is made from wire conventionally used for bird cages.

The pole assembly 14 includes a first adjustable portion 30 and a second adjustable portion 32 which are adjustable longitudinally with respect to each other. More specifically, the first adjustable portion 30 has external threads, and the second adjustable portion 32 has complimentary internal threads. By rotating the first adjustable portion 30 with respect to the second adjustable portion 32, the first adjustable portion 30 can be raised or lowered, thereby raising or lowering the ceiling-contacting assembly 16 with respect to a room ceiling. Moreover, by raising the first adjustable portion 30 with respect to the second adjustable portion 32, an increased pressure is exerted against the ceiling-contacting assembly 16, and the ceiling-contacting assembly 16 is more firmly secured to the ceiling of the room.

The pole assembly 14 includes a plurality of modules 38 that have a head end 40 and a tail end 42 and arranged in head-to-tail fashion longitudinally to construct a pole assembly 14 approximating the distance between the floor and ceiling of the room.

As shown in FIG. 6, a junction assembly 46 is connected in-line with modules 38 of the pole assembly 14. The junction assembly 46 has a head end 48 and a longitudinal tail end 50. The tail end 50 of the junction assembly 46 receives a head end 40 of a module 38, and the head end 48 of the junction assembly 46 is received by a tail end 42 of a module 38. In addition, the perch assembly 34 is comprised of a first perch member 52 and a second perch member 54 each of which includes a head end 56 that is adapted to fit into a corresponding lateral tail end 58 in the junction assembly 46. Caps 64 can be placed on ends of the first and second perch members.

The modules 38 of the pole assembly 14 can be connected in head-to-tail fashion to any desired height. In addition to the modules 38, cage segments can also be connected in head-to-tail fashion to provide an overall cage of any desired height.

To use with added cage segments 71 placed in head-to-tail fashion, a segment connector assembly 70 is provided as shown in FIG. 7. Added cage segments 71 placed in head-to-tail fashion are shown schematically in FIG. 8. The segment connector assembly 70 is shaped in the form of a hollow cylinder and has an upper groove 72 and a lower groove 74. The upper groove 72 receives the bottom edge of an upper cage segment, and the lower groove 74 receives the top of a lower cage segment. If desired, a plurality of added cage segments can be employed using additional segment connector assemblies 70. Additional cage segments can be stacked with additional segment connector assemblies 70 to provide an overall cage that can be extended essentially from the floor to the ceiling. Although individual cage segments can be made in any desirable heights, it is contemplated that cage segments be made having respective heights of 12, 18, and 36 inches.

As shown in FIG. 9, in accordance with another aspect of the invention, instead of using simple segment connector assemblies 70 as shown in FIGS. 7 and 8, one or more combined segment connector/tray assemblies 76 can be used to be stacked with alternating cage segments 71 to form a vertically arrayed series of cage regions separated from one another by removable trays 78. Each combined segment connector/tray assembly 76 includes a top groove 77 and a bottom groove 79.

Figure 10:
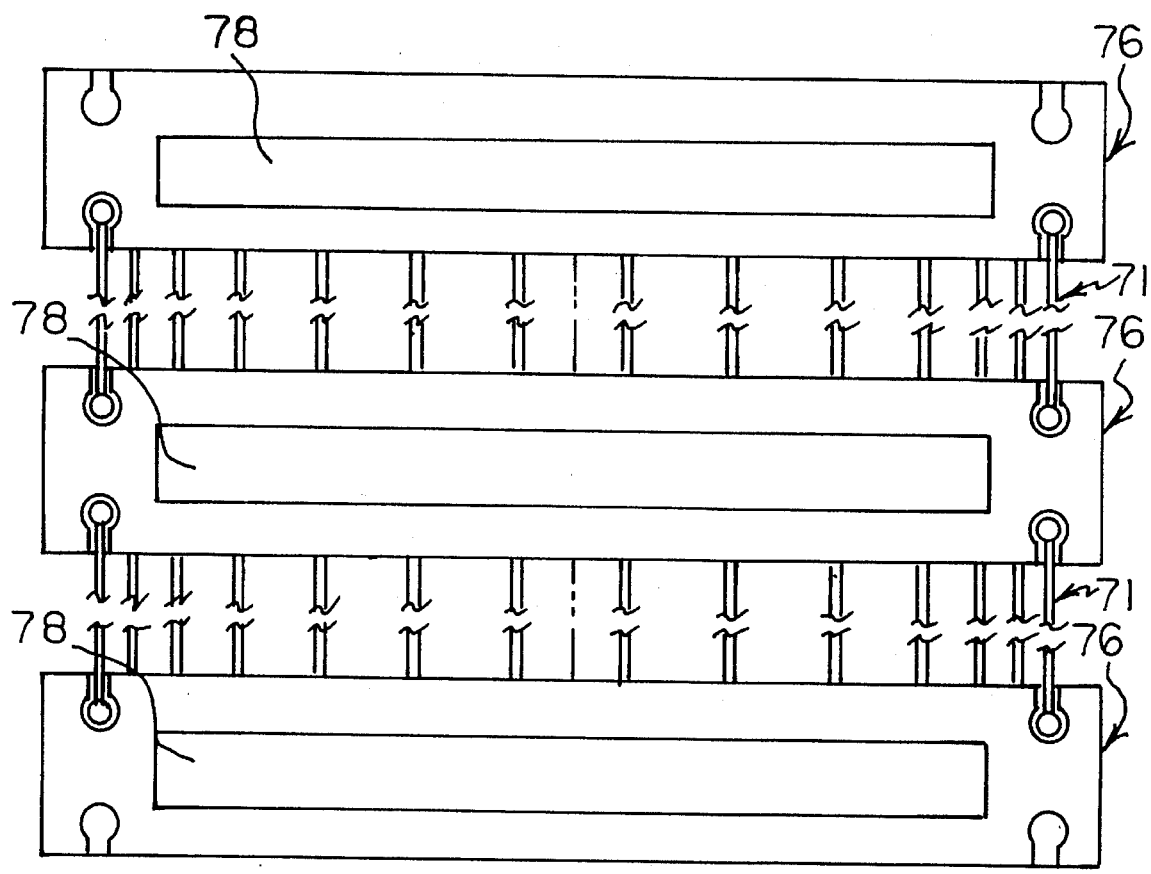
FIG. 10 is a schematic diagram of a number of cage segments connected in head-to-tail fashion in a stack with intervening combined segment connector/tray assemblies in between the cage segments.

A vertically arrayed vertical stack of cage regions which include cage segments 71 separated by combined segment connector/tray assemblies 76 is shown schematically in FIG. 10. If desired, a separate and distinct bird can occupy each separate and distict cage region.

Figure 11:
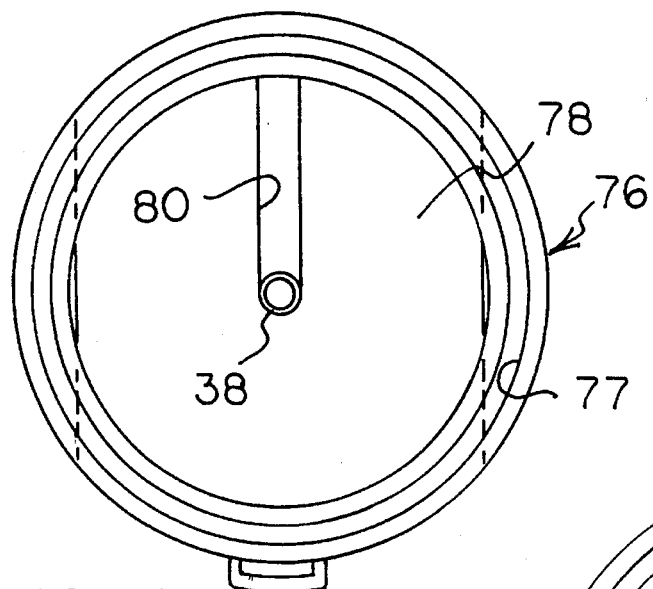
FIG. 11 is a top view, looking down on a combined segment connector/tray assembly showing a removable tray with its slot that permits removal and replacement of the removable tray in the presence of the modules of the pole assembly.

FIG. 11 shows a top view of a removable tray 78 in a combined segment connector/tray assembly 76. The removable tray 78 has a slot 80 through which the modules 38 pass when the removable tray 78 is removed from or replaced in the combined segment connector/tray assembly 76 which has a channel 82 (shown in FIG. 9) into which the removable tray 78 is placed or removed. The channel 82 and the removable tray 78 are designed and sized to that the removable tray 78 can be easily lifted in the channel 82 and removed from the channel 82 for easy removal, cleaning, and replacement. Two removable trays 78 can be placed in each channel 82 so that when one removable tray 78 is removed for cleaning, the other removable tray 78 can be left in position to serve its division function to keep the cage assembly 26 divided into separate and distinct cage regions.

Figure 12:
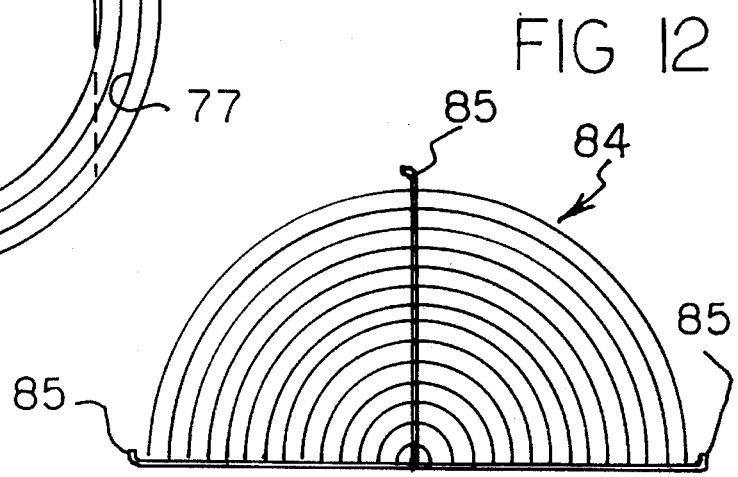
FIG. 12 is a top view of a bird exclusion device that can be installed in a cage segment.

Furthermore, as shown in FIG. 12, a bird exclusion device 84 is provided that permits a person to safely service the inside of a cage containing an aggressive bird. More specifically, two identical bird exclusion devices 84 are inserted vertically between wire cage enclosure bars and dropped to a horizontal position so that support hooks 85 are over a horizontal bar in a cage, thereby restricting movements of a bird in the cage. The bird exclusion devices 84 serve as temporary, variable height ceilings in the cage that restrict vertical movement of a bird contained with the cage.

In addition, as shown in greatest detail in FIG. 3, a lock assembly is provided for locking the upper pan assembly 22 and the lower pan assembly 18 onto selected positions on the pole assembly 14. For the upper pan assembly 22 and the lower pan assembly 18, the lock assembly includes a compressible and expansible assembly 60 that is located peripheral to the pole assembly 14. A knurled nut 62 is threaded onto the compressible and expansible assembly 60 to compress the assembly 60 and secure the upper pan assembly 22 against the pole assembly 14 at a selected position.

The components of the bird perch apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved bird perch apparatus that is low in cost, relatively simple in design and operation, and which advantageously utilizes a large amount of the vertical distance from the floor to the ceiling in room. With the invention, a bird perch apparatus is provided which prevents a cage from sliding off or being knocked of a horizontal support. With the invention, a bird perch apparatus is provided which is not suspended from a ceiling support. With the invention, a bird perch apparatus is provided which is stabilized by both a floor and a ceiling of a room. With the invention, a bird perch apparatus is provided which is supported in a way so that the distance of the cage from the floor can be adjusted to accommodate the height of a person. With the invention, a bird perch apparatus provides extensive air space within the cage without occupying much floor space. With the invention, a bird perch apparatus is provided which simulates real tree branches.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A bird perch apparatus, comprising:

a floor base assembly, a pole assembly connected to said floor base assembly, wherein said pole assembly includes a first adjustable portion and a second adjustable portion which are adjustable longitudinally with respect to each other, wherein said pole assembly includes a plurality of modules having a head end and a tail end and arranged in head-to-tail fashion, a ceiling-contacting assembly connected to said pole assembly, a lower pan assembly supported by said pole assembly, an upper pan assembly supported by said pole assembly a predetermined distance above said lower pan assembly, a perch assembly connected to said pole assembly at a position along said pole assembly between said lower pan assembly and said upper pan assembly, and a cage assembly supported by said lower pan assembly and capped by said upper pan assembly, wherein said cage assembly includes a plurality of cage segments placed in head-to-tail fashion with intervening segment connector assemblies.

2. The apparatus of claim 1 wherein said lower pan assembly is circular and includes a central aperture for receiving said pole assembly.

3. The apparatus of claim 1 wherein said upper pan assembly is circular and includes a central aperture for receiving said pole assembly.

4. The apparatus of claim 1 wherein said cage assembly includes a plurality of cage segments placed in head-to-tail fashion with intervening combined segment connector/tray assemblies.

5. The apparatus of claim 4 herein said combined segment connector/tray assemblies include removable trays.

6. The apparatus of claim 1 wherein said cage assembly includes a bird exclusion device which serves as a temporary, variable height ceiling in the cage assembly that restricts vertical movement of a bird contained within the cage assembly.

7. A bird perch apparatus, comprising:

a floor base assembly, a pole assembly connected to said floor base assembly, wherein said pole assembly includes a first adjustable portion and a second adjustable portion which are adjustable longitudinally with respect to each other, wherein said pole assembly includes a plurality of modules having a head end and a tail end and arranged in head-to-tail fashion, a ceiling-contacting assembly connected to said pole assembly, a lower pan assembly supported by said pole assembly, an upper pan assembly supported by said pole assembly a predetermined distance above said lower pan assembly, a perch assembly connected to said pole assembly at a position along said pole assembly between said lower pan assembly and said upper pan assembly, and a cage assembly supported by said lower pan assembly and capped by said upper pan assembly, wherein said cage assembly includes a plurality of cage segments placed in head-to-tail fashion with intervening combined segment connector/tray assemblies, wherein said combined segment connector/tray assemblies include removable trays, wherein said removable trays include slots which permit said removable trays to be removed from and replaced into said combined segment connector/tray assemblies in the presence of modules of said pole assembly.

* * * * *